United States Patent Office 2,749,220
Patented June 5, 1956

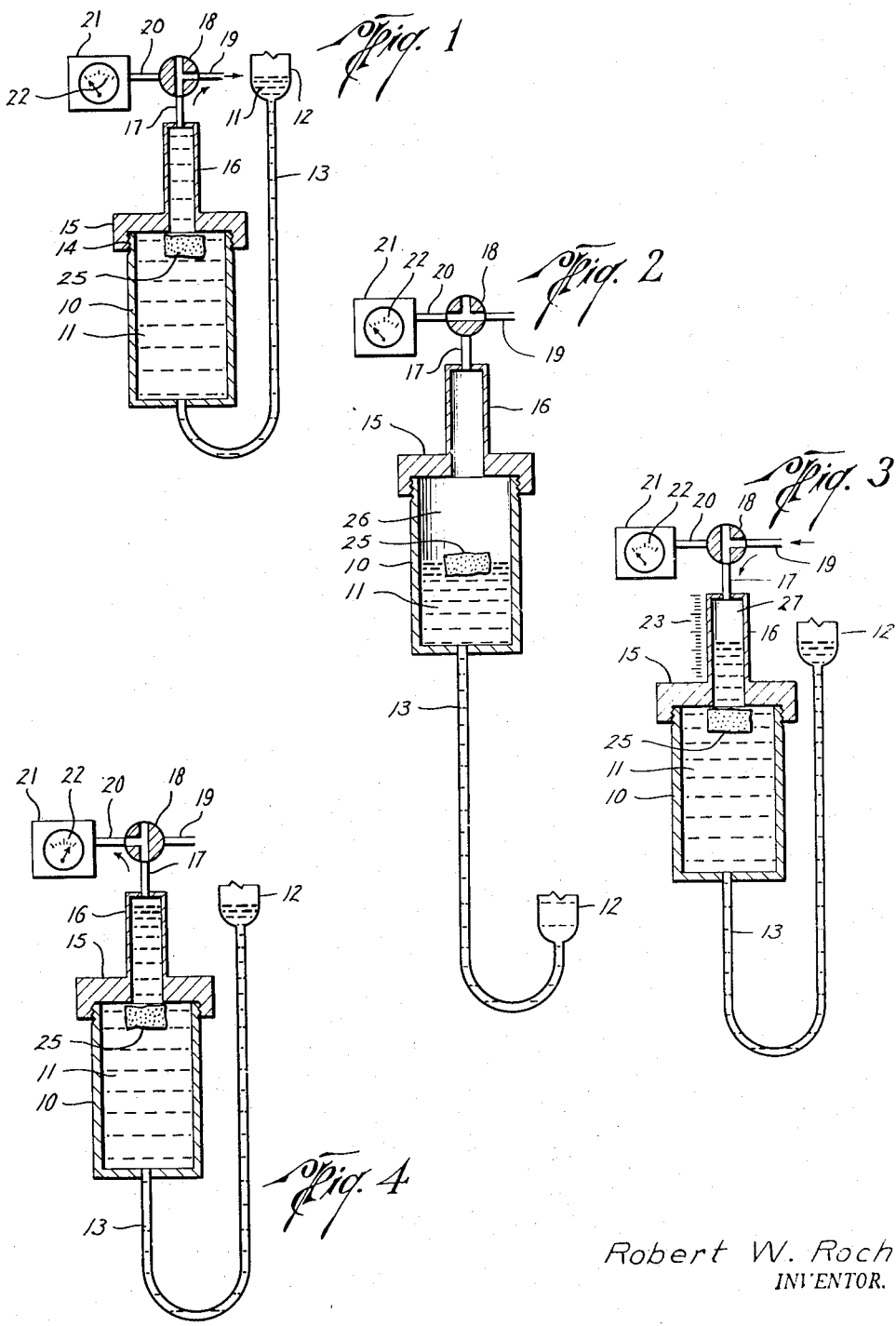

2,749,220

METHOD FOR MEASURING GAS IN CORES

Robert W. Rochon, San Antonio, Tex., assignor to Monarch Logging Company, Inc., San Antonio, Tex., a corporation of Texas Application September 21, 1953, Serial No. 381,223

2 Claims. (Cl. 23—230)

This invention relates to the determination of the hydrocarbon gas content of earth samples. More particularly, the present invention is directed to a method for measuring the hydrocarbon gas content of solid cores removed from earth formations during the drilling of a well such as an oil or gas well.

In the drilling of oil and gas wells, particularly by the well-known rotary method, various means are employed to test the earth strata penetrated by the drill for their contents of oil and gas in order to determine commercial production possibilities of such strata. One commonly used testing device employed for this purpose is the "side-hole sampler" by which a small coring tool may be driven laterally into the earth formation forming the wall of the well bore for removing therefrom a small section of the formation. Such "side-hole" samples are generally in the form of a small solid core having a volume of a relatively few cubic centimeters.

The small cores are brought to the surface and subjected to various types of examination to determine the properties of the strata from which they are taken. One of the principal tests applied is to determine the hydrocarbon gas content of the core. Because of the very small volume of material which constitutes most such cores, the quantities of hydrocarbon gases present in the cores will usually be quite small even in the case of relatively rich strata, for much of the original gas content will be lost by expansion and leakage from the core as the pressure is reduced thereon during passage of the core from its place of removal deep in the well to the surface.

The methods commonly employed for determining the hydrocarbon gas content of such cores are generally time-consuming and laborious and quite inaccurate and will in many cases, therefore, provide unreliable information on this important property of the earth strata being tested.

The present invention has for its principal object the provision of a relatively simple method and apparatus by which the hydrocarbon content of solid earth formation cores may be determined quickly and with a high degree of accuracy.

Generally stated, the present invention contemplates a method whereby a solid core is subjected to vacuum extraction in an evacuated chamber, air is then mixed with the extracted gas in the chamber to form therewith an air-gas mixture of known volume and the proportion of hydrocarbon gas in the mixture is then determined by suitable analytical means, as by transferring the air-gas mixture from the chamber directly to an instrument which is adapted to quantitatively determine the proportion of hydrocarbon gas in such air-gas mixtures. Such an instrument is preferably of the well-known "hot-filament" type conventionally employed for such determinations.

Other and more specific objects of this invention will become more readily apparent from the following detailed description when read in conjunction with the accompanying drawing which illustrates more or less schematically a form of apparatus suitable for practicing the method of the present invention.

In the drawing:

Figs. 1 to 4 illustrate more or less schematically a suitable apparatus, the several figures illustrating a series of stages in the manipulation of the apparatus for performing the method of the invention.

Referring to the drawing, the apparatus includes a hollow vessel 10 containing a body of liquid mercury 11. A levelling bulb 12 is connected into the bottom of vessel 10 by means of a flexible tube 13, the bulb 12 serving as a reservoir for the mercury. It will be understood that by raising and lowering levelling bulb 12 relative to vessel 10, the level of mercury in the latter may be correspondingly raised and lowered. The upper end of vessel 10 is externally threaded at 14 to receive a screw cap 15 which is thereby adapted to be removably connected to the vessel to form a fluid-tight closure therefor. Cap 15 is provided with an upwardly projecting tubular neck 16, the bore of which is in open communication with the interior of vessel 10. A small conduit 17 is connected at one end to the upper end of neck 16 and at the other end is connected to a multi-port valve 18, preferably a conventional three-way valve, which, by appropriate manipulation, may be employed to close conduit 17 or to place the latter selectively in communication with either a pipe 19 or a pipe 20. Pipe 19 is open to the atmosphere, while pipe 20 leads to a hydrocarbon gas-analyzer 21, which is preferably of the well-known hot filament type. The details of such analyzer do not form a part of the present invention, but as is well understood, such instruments employ a Wheatstone bridge arrangement in one leg of which is mounted a heated platinum filament which, when exposed to a hydrocarbon gas-air mixture becomes more highly heated and unbalances the bridge. The degree of unbalance so produced is a measure of hydrocarbon gas content of the air-gas mixture, and is indicated or recorded on a suitable meter, such as the meter 22, which may be calibrated to indicate or record directly the percentage of hydrocarbon gas in the mixture.

Neck 16 is provided with an appropriately positioned longitudinal scale 23 (shown in Fig. 3) having graduations calibrated to provide a measure of the internal volume of the neck above any point therein for purposes to be more fully described hereinafter.

The operation of the device in performing the method of this invention is as follows:

A solid core 25 of an earth formation is placed in vessel 10. It will be understood, of course, that the mercury level in the vessel will first have been lowered below the upper end of the vessel. Cap 15 is then screwed tightly on the top of the vessel and the levelling bulb raised to a height sufficient to completely fill the apparatus with mercury whereby to displace all extraneous air from the interior of vessel 10, neck 16 and the connections to valve 18. In this operation valve 18 will be turned so as to place conduit 17 in communication with pipe 19 so that the displaced air may be discharged to the atmosphere, levelling bulb 12 being raised to the level of pipe 19, as illustrated in Fig. 1.

With the apparatus thus filled with mercury, valve 18 will be turned to a position closing off communication between conduit 17 and pipes 19 and 20, this position being illustrated in Fig. 2. Levelling bulb 12 will then be lowered to a position well below vessel 10 to cause the mercury level inside the vessel to fall thereby creating a vacuum in vessel 10 and neck 16 above the mercury level and providing the evacuated chamber 26 above the mercury level. Under the influence of the vacuum thus created in chamber 26 any gas contained in core 25 will be withdrawn therefrom into chamber 26 and will be trapped therein above the mercury level. The extent to which levelling bulb is lowered will determine the magnitude of the vacuum created in chamber 26 which will be such as to assure withdrawal from the core of as much as possible of the contained gas.

The levelling bulb is then raised to a level alongside neck 16 to raise the mercury into the neck and to thereby collect all of the gas in the neck and confine the gas within the space 27 therein above the mercury level. (Fig. 3.) The volume of space 27 will be known by measurement on scale 23 and can be varied as desired by positioning bulb 12 at the desired elevation relative to neck 16. Generally, it will be found most convenient to manipulate levelling bulb 12 so that the volume of space 27 will be about twice the volume of core 25. Thus, for example, if the volume of core 25 is about 10 cubic centimeters, space 27 will be made to have a volume of about 20 cubic centimeters.

Since, however, the mercury level in neck 16 is still below the original level when valve 18 was closed, space 27 will still be under sub-atmospheric pressure. Valve 18 will next be turned to place conduit 17 in communication with pipe 19 and thus open to the atmosphere (Fig. 3). The sub-atmospheric pressure existing in space 27 will cause atmospheric air to be drawn through pipe 19 and conduit 17 into space 27 until the pressure therein is equalized with atmospheric pressure and space 27 will now be filled with an air-gas mixture of known volume, namely, the volume of space 27.

Valve 18 is then turned to place conduit 17 in communication with pipe 20 (Fig. 4) and levelling bulb 12 will then be raised to raise the mercury level in neck 16 and thereby displace the air-gas mixture from space 27 through conduit 17 and pipe 20 directly into analyzer 21 (Fig. 4). The air-gas mixture passing into the analyzer will activate the instrument to indicate on meter 22 the percentage of hydrocarbon gas in the air-gas mixture.

The total volume of the air-gas mixture being known from scale 23, and since meter 22 gives the percentage of hydrocarbon gas in the mixture, it is a matter of simple computation to determine therefrom the volume of hydrocarbon gas in the core.

When a determination has been completed, valve 18 may be turned again to the position shown in Fig. 1 and levelling bulb 12 lowered sufficiently to lower the mercury level in vessel 10 below cap 15, which may then be removed to permit replacement of core 25 by a new core, after which the above-described sequence of operations may be repeated to determine the hydrocarbon gas content of the new core.

It will be evident from the foregoing that this invention provides a simple, easily operated and highly accurate method for determining the hydrocarbon gas content of solid cores. It will be understood that this invention is not limited to the specific details of the illustrative embodiment but embraces the method more broadly defined by the appended claims.

What I claim and desire to secure by Letters Patent is:

1. The method of determining the hydrocarbon gas content of a solid earth formation core, comprising, introducing the core into a chamber containing a body of liquid mercury, completely displacing extraneous air from the chamber with the mercury, thereafter sealing the chamber, then lowering the mercury level whereby to create in the chamber a vacuum sufficient to withdraw the gas from the core into the chamber, introducing air from outside the chamber into the evacuated chamber to form with the extracted gas therein an air-gas mixture of known volume, elevating the mercury level in the chamber to thereby displace the mixture from the chamber, and determining the proportion of hydrocarbon gas in said mixture.

2. The method of determining the hydrocarbon gas content of a solid earth formation core, comprising, introducing the core into a chamber containing a body of liquid mercury, completely displacing extraneous air from the chamber with the mercury, thereafter sealing the chamber, then lowering the mercury level whereby to create in the chamber a vacuum sufficient to withdraw the gas from the core into the chamber, introducing air from outside the chamber into the evacuated chamber to form with the extracted gas therein an air-gas mixture of known volume, elevating the mercury level in the chamber to thereby displace the mixture from the chamber, passing the mixture directly into a hydrocarbon gas analyzer, and therein determining the proportion of hydrocarbon gas in said mixture.

References Cited in the file of this patent

UNITED STATES PATENTS

| | | |
|---|---|---|
| 1,919,861 | Rodhe | July 25, 1933 |
| 2,330,717 | Horvitz | Sept. 28, 1943 |
| 2,488,812 | Galstaun et al. | Nov. 22, 1949 |
| 2,639,980 | Francis | May 26, 1953 |
| 2,641,922 | Smith | June 16, 1953 |
| 2,663,379 | Doan | Dec. 22, 1953 |

FOREIGN PATENTS

| | | |
|---|---|---|
| 174,599 | Austria | Apr. 10, 1953 |

OTHER REFERENCES

Ser. No. 249,348, Weber (A. P. C.), published Apr. 27, 1943.